United States Patent
Doumbos et al.

(10) Patent No.: US 7,585,270 B2
(45) Date of Patent: Sep. 8, 2009

(54) TREATMENT OF HAZARDOUS WASTE MATERIAL

(75) Inventors: Jon Doumbos, North Sydney (AU); David Garman, North Sydney (AU); Geoff W Richardson, North Sydney (AU)

(73) Assignee: Dolomatrix International Limited, North Sydney, NSW (AU)

( * ) Notice: Subject to any disclaimer, the term of this patent is extended or adjusted under 35 U.S.C. 154(b) by 0 days.

(21) Appl. No.: 11/950,922

(22) Filed: Dec. 5, 2007

(65) Prior Publication Data

US 2008/0146860 A1  Jun. 19, 2008

Related U.S. Application Data

(63) Continuation of application No. 11/800,552, filed on May 7, 2007, which is a continuation-in-part of application No. 10/512,669, filed as application No. PCT/AU03/00503 on Apr. 29, 2003, now abandoned.

(30) Foreign Application Priority Data

Apr. 29, 2002  (AU) ..................................... PS2007

(51) Int. Cl.
*B09B 3/00* (2006.01)
(52) U.S. Cl. .................................................. 588/256
(58) Field of Classification Search ................. 588/256, 588/249, 252, 257
See application file for complete search history.

(56) References Cited

U.S. PATENT DOCUMENTS 6,200,381 B1  3/2001  Rechichi

FOREIGN PATENT DOCUMENTS

| EP | 0352096 | 1/1990 |
|---|---|---|
| EP | 0547923 | 6/1993 |
| EP | 0571292 | 11/1993 |
| WO | 92/18437 | 10/1992 |
| WO | 97/20784 | 6/1997 |
| WO | 98/54107 | 12/1998 |
| WO | WO 9854107 A1 * | 12/1998 |

OTHER PUBLICATIONS

European Search Report-EP03747366.7.
International Search Report-PCT/AU03/00503.

* cited by examiner

*Primary Examiner*—John Kreck
(74) *Attorney, Agent, or Firm*—Ladas & Parry LLP

(57) ABSTRACT

A method of incorporating a material in a settable binder is disclosed. The binder includes a source of caustic magnesium oxide. The method involves mixing the material with the binder, either as part of a slurry or for subsequent formation into a slurry, and then adding a setting agent to the slurry. The setting agent is added to enhance setting of the binder. The material can be a hazardous waste material or components thereof. The inventors have surprisingly discovered that when the setting agent is added after mixing of the material with the binder, that a superior setting of the material in the binder can be achieved. The settable composition can comprise only a caustic magnesium oxide binder and a setting agent for the binder, as the inventors have surprisingly discovered that there is no need for any other binding agents, thus providing a simpler binder composition and method of use.

8 Claims, No Drawings

TREATMENT OF HAZARDOUS WASTE MATERIAL

This application is a Continuation of U.S. Ser. No. 11/800,552, filed on May 7, 2007, which is a Continuation-in-Part of U.S. Ser. No. 10/512,669, filed on Jun. 13, 2005, now abandoned which is a U.S. National Phase Completion of International Patent Application Serial No. PCT/AU03/00503 filed Apr. 29, 2003 which claims priority to Australian Application No. PS 2007 filed Apr. 29, 2002.

FIELD OF THE INVENTION

The present invention relates to settable binder compositions that can be used to incorporate, capture or encapsulate hazardous waste materials. Particularly though not exclusively the invention relates to a method of capturing hazardous waste materials including heavy metals such as cadmium, mercury, lead, nickel and chromium residues; a variety of forms of arsenic including sulfide, trioxide and pentoxide; and other hazardous and non-hazardous materials.

BACKGROUND ART

Arsenic and arsenic containing compositions have been widely used in Australia as sheep and cattle dips, and have also been used in pesticides. Mercury and mercury containing compositions have also been widely used in Australia and other countries. With the phasing out of arsenic and mercury compounds (due to their toxicity), a large stockpile of waste arsenic and mercury components exists.

Organo nickel and chromium, and nickel and chromium containing compositions are widely used in Australia and other countries. Metal plating and anodising processes use these compounds, and the processes generate waste nickel and chromium residues which are quite concentrated and are stored in drums. The residue is hazardous and toxic and a large stockpile of waste nickel and chromium components exists.

A variety of organic waste materials, some of which are hazardous, are produced as by-products of various industrial processes. These organic wastes include contaminated oils and greases, organo-chlorine compounds including pesticides, and chlorinated aromatic compounds including chlorobenzene and polychlorinated biphenyl compounds.

The above mentioned waste materials and toxic components are housed in drums that have a limited life. The components in the drum are typically in the form of a contaminated liquid or sludge that is almost impossible to safely encapsulate. The sludge contains a variety of contaminants such as rust from the drum, waste particles, solids, and a variety of liquids.

Radioactive materials and components are also hazardous substances and it is difficult to find an acceptable method of their disposal. Various proposals have been trialled for encasement or encapsulation of radioactive materials which can then be disposed of by burial in uninhabited areas.

Attempts to encapsulate hazardous waste materials in concrete have met with limited success as concrete and cement do not bind well in the presence of such contaminants. However, concrete or concrete-like products would be otherwise ideal for encasement as the concrete is hard, has a very long life, and can be moulded prior to setting.

U.S. Pat. No. 6,200,381 discloses a settable binder composition consisting essentially of a mixture of a calcium carbonate and a caustic magnesium oxide. The mixture may be derived from a naturally-occurring dolomite which has been calcined to cause preferential decarbonisation of the magnesium carbonate by liberating carbon dioxide, without substantially decarbonising the calcium carbonate. This calcination results in a mixture of magnesium oxide, magnesium carbonate and calcium carbonate ($MgO$, $MgCO_3$ and $CaCO_3$). Alternatively, a synthetic blend may be formed by mixing calcium carbonate with preformed caustic magnesium oxide. Various additives and fillers may be included in the binder to modify the properties of the set composition. The resulting product was found to have high compressive strength and other properties which make it ideal for manufacturing building products such as bricks, blocks, pavers, tiles, etc.

WO98/54107 describes a method of encapsulating hazardous waste materials using essentially the same settable composition containing calcium carbonate and a caustic magnesium oxide. Tests conducted on the encapsulated material indicate that virtually none of the hazardous waste material was leached out of the set composition, which has a concrete-like appearance.

The presence of the calcium carbonate in these settable binder compositions:

(i) helps to control the setting rate, ie., the higher the amount of calcium carbonate the slower the setting rate. The control of setting rate is important in the manufacture of building materials, where a "working time", or time during which the set is slower, is required in order to allow placement into moulds.

(ii) modifies certain physical properties of the set composition, including lowering the shrinkage and brittleness of the final product.

In some situations successful waste encapsulation is not reliant on having high, unconfined compressive strength, nor is low shrinkage or increased working time to allow placement in moulds required. Working time can be controlled sufficiently by adding extra water when forming a slurry from the mixture of the hazardous waste material and the binder composition. While the absence of the calcium carbonate is accompanied by a significant reduction in the unconfined compressive strength of the set composition, disposal regulations relating to the treatment of waste do not require a high strength product containing encapsulated waste materials.

SUMMARY OF THE INVENTION

In a first aspect the present invention provides a method of incorporating a material in a settable binder, the method comprising the steps of:

(a) mixing the material with the binder, as a slurry or for subsequent formation into a slurry, the binder including a source of caustic magnesium oxide;

(b) adding an organic acid additive to the material, the binder or a mixture thereof;

(c) after steps (a) and (b), adding a setting agent to the slurry that enhances setting of the binder.

The inventors have surprisingly discovered that when the setting agent is added after the mixing of the material and the binder (mixed either dry and then slurried or mixed while in a wet slurry form), a superior setting of the material can be obtained to minimise leaching of incorporated material from the resultant set binder.

When mixed in a slurry it is surmised that the setting agent is more evenly dispersed and, as a result, once the binder has set, the resulting product has better physical strength properties compared with the situation where the setting agent is added prior to the formation of a slurry of material and binder. In the latter situation, a more unevenly set product can be the result.

In the present invention the inventors have surprisingly discovered that the increase in the strength of the product achieved by adding the setting agent after the mixing of the material and the binder can yield a product with lower shrinkage and brittleness, and thus compensate for any absence of calcium carbonate in the binder.

Slurries also have the added advantage of being easier to physically handle by stirring, pumping or pouring etc compared with dry mixtures or relatively dry paste-like mixtures.

Preferably the setting agent comprises between 0.1 to 30% by weight of the caustic magnesium oxide in the mixture.

Preferably the setting agent is selected from the group comprising: sulfates and chlorides.

Preferably the setting agent is selected from the group comprising metal sulfates, such as magnesium sulfate, iron sulfate and aluminium sulfate.

Alternatively, preferably the setting agent is selected from the group comprising metal chlorides, such as iron chloride and sodium chloride.

Preferably the slurry is an aqueous slurry.

Preferably the material is a hazardous material or component thereof such as a waste material. Such wastes can include toxic or poisonous substances which are harmful to living beings.

Preferably the additive is selected from the group: citric acid, lemon acid, acetic acid, glycolic acid, oxalic acid, other di or poly carboxylic acids, tartaric acid, salicylic acid, ethylenediamine tetra acetic acid (EDTA) and other tetra acids.

In a second aspect the present invention provides a settable binder composition comprising only a caustic magnesium oxide binder mixed with a setting agent for the binder.

The expression "comprising only a caustic magnesium oxide binder" means that only this material is present to act as a binder. It does not exclude the addition of other components to the composition such as fillers, carbonation agents, acidifying agents etc. However, surprisingly the inventors have discovered there is no need for any other binding agents or products, representing an advance over known binder compositions (eg. U.S. Pat. No. 6,200,381) and a simpler binder composition.

Preferably the settable binder composition of the second aspect has a setting agent as defined in the first aspect.

In a third aspect the present invention provides a method of incorporating a hazardous waste material or components thereof in a settable binder, the method comprising the steps of:

mixing the hazardous waste material with a settable binder composition, as a slurry or for subsequent formation into a slurry, the composition comprising only a caustic magnesium oxide binder and a setting agent for the binder; and allowing the slurry to set to incorporate the waste material or components thereof.

Preferably the method of the third aspect is otherwise as defined in the first aspect.

Once again, the expression "comprising only a caustic magnesium oxide binder" means that only this material is present to act as a binder. It does not exclude the addition of other components to the composition such as fillers, carbonation agents, acidifying agents etc. However surprisingly in this method the inventors have discovered there is no need for any other binding agents or products, representing an advance over known binder compositions (eg. U.S. Pat. No. 6,200,381) and a simpler binder composition and method.

The term "caustic magnesium oxide" includes a magnesium composition which comprises magnesium carbonate and a decarbonated magnesium oxide. The term can also cover a pure magnesium oxide or a magnesium oxide mixed with other minor substances. The term also covers a magnesium carbonate which has been treated, for instance, by heating, to liberate carbon dioxide, thereby forming a composition which is partially calcined. The exact structure of the composition, and of the caustic magnesium oxide, is not known but the term will be used to include the structure formed by heating magnesium carbonate to partially decarbonate it, especially at the temperature ranges described. The term "a source of caustic magnesium oxide" can refer to a supply of a caustic magnesium oxide which is combined with other components naturally (for example in a dolomitic ore ie. a calcium and magnesium carbonate ore found in nature) or artificially (for example in a supply of calcined magnesium carbonate obtainable commercially with around 90-95% purity).

MODES FOR CARRYING OUT THE INVENTION

In practising preferred forms of the present invention, the caustic magnesium oxide is preferably obtained by partially calcining magnesite (notably having less than 10% calcium carbonate and in some cases no calcium carbonate) at a temperature typically within the range of 500° C. to 1000° C. to form a crystalline magnesium oxide (MgO). Calcination is preferably performed at temperatures within the range 500° C. to 800° C. for higher reactivity. This results in caustic magnesium oxide typically retaining between 2% and 50% of the carbon dioxide and is highly reactive.

References to "encapsulation" are intended to include "microencapsulation" of hazardous and non-hazardous waste materials. The waste materials are microencapsulated by the settable binder composition of the present invention in such a manner that the particles of the waste material are substantially immobilised within the matrix of the set composition. Tests for measuring the leach rate of the waste materials from the set composition, based on the standard Toxicity Characteristic Leaching Procedure (TCLP) in accordance with US-EPA 1311 method, show that the leach rate is well within environmentally acceptable limits.

Various additives can be added to the settable binder. The additive or additives may accelerate the formation of strong binding agents, and may assist in the recrystallisation of the settable binder composition to make it set. In the setting process, various added fillers other than the material or waste material to be encapsulated (which can include organic fillers, inorganic fillers, solid and liquid fillers and the like) can be trapped in the set binder.

Another desirable additive is one that acts as a source of carbonation in the composition to assist in the setting process. A carbonate which can decompose or react to liberate carbon dioxide is preferred. One suitable additive can be a metal carbonate such as sodium carbonate. Another suitable additive can include a carboxylic or polycarboxylic acid which can react to liberate carbon dioxide. Another advantage of sodium carbonate is that it will carbonate any completely oxidised fillers which may be used (for instance coal ash).

Other additives may include citric acid, lemon acid, acetic acid, glycolic acid, oxalic acid, other di or poly carboxylic acids, or other acidifying agents. Possible substitutes for the citric acid include tartaric acid, salicylic acid, ethylenediamine tetra acetic acid (EDTA) or other tetra acids. These additives may be added at between 0.01%-30%, more typically 0.01% to 5%. If the additives (such as citric acid or lemon acid) are solids, they are suitably pre-ground and powdered to enable them to be efficiently blended with the remainder of the composition. A grind size <63 micrometers can be used. Another acidifying agent may comprise sulfuric acid and this may be added to the water mixture in up to 5% by weight.

In practising the method of the invention, the settable binder includes a source of caustic magnesium oxide. The method first involves mixing the selected waste material (or components thereof) with the binder in a fluid slurry by stirring or other agitation. If dry initially, the selected waste can be first mixed dry with the binder and then subsequently formed into a slurry, or, if the selected waste is present in a slurry initially, the binder can be added to it. In either case a setting agent is then added to the slurry of waste and binder to enhance setting of the binder. In one preferred example the setting agent is aluminium sulfate, although other sulfates can also be used, for example magnesium sulfate or iron sulfate. In other preferred embodiments, the setting agent can be iron chloride or sodium chloride. The aluminium sulfate may be commercially available aluminium sulfate having water of crystallisation or being anhydrous. Additionally, a salt such as sodium chloride can be provided.

Optionally the organic acid additives (such as citric acid) are added to the mixture of waste material and settable binder and normally prior to the addition of the settable binder. It should be noted that in some situations all of the reagents such as a setting agent (eg. aluminium sulfate) and the optional organic acid (eg. citric acid) can be combined together with the waste material in a slurry prior to addition of a settable binder (that includes caustic magnesium oxide). Examples of such situations are given in the following Examples 1A to 13A inclusive ("A" examples). This methodology does produce a product which satisfactorily meets the leachability standards required for environmental disposal. However, in other examples in accordance with the invention, just the optional organic acid (eg. citric acid) is combined together with the waste material in a slurry prior to addition of a settable binder (which includes caustic magnesium oxide). This step is then followed by the addition of the setting agent (eg. aluminium sulfate). Examples of such situations are given in the following Examples 1B to 13B inclusive ("B" examples), all of which demonstrate a satisfactory compliance with leachability standards required for environmental disposal of the resulting product.

In the present invention, the settable binder composition used need only comprise a caustic magnesium oxide binder and a setting agent for the binder. In preferred embodiments the setting agent comprises between 0.1 to 30% by weight of the caustic magnesium oxide in the mixture.

Additives can be pre-mixed and added to the composition. The amount of pre-mix added can vary for instance from about 1%-10% or more. It appears that when fillers of small size (for example below 70 micrometers) are used, the amount of pre-mix added should be larger (about 10%), while fillers of larger size allow less pre-mix to be added (eg. 3%-7%).

If the pre-mix comprises (a) aluminium sulfate, (b) an organic acid and (c) a salt, it is preferred that (a) is present between 40%-99%; (b) is present between 0%-60% and (c) is present between 0%-20%.

It has been found that quantities of the organic acid, preferably citric acid, can be used in the binder composition to effect encapsulation of waste materials. When used, this acid is normally added to the waste material or other material to be encapsulated prior to addition of the binder caustic magnesium oxide. It is thought that the acid performs at least two functions:

(a) it appears to act primarily as a chelating agent to trap ionic species and render them less mobile for subsequent encapsulation by the caustic magnesium oxide; and
(b) it appears to act as a set modifier to control the heat of reaction when water, caustic magnesium oxide and a suitable setting agent react.

Whilst not wishing to be bound by theory, it appears that several chemical reactions are likely to be occurring simultaneously, often synergistically, but clearly also dependent on the type of waste material. For heavy metals and other ionic cations, a chelating mechanism is likely to be occurring rapidly. Citric acid is a rapid and effective chelating agent. As the leachable chemicals are typically ionic and mobile, chelation is an effective method of lowering the mobility of the leachable species. The presence of a metal salt, eg. aluminium sulfate, is likely to react with the citric acid or itself be chelated with the ionic waste, further lowering the mobility and possible the solubility of the chelate. The process of microencapsulation is then completed by the reaction of the chelate and metal sulfate with the caustic magnesium oxide. The inherently strong bonding capability of the caustic magnesium oxide with both organic (eg. the chelated ionic species) and inorganic (eg. the metal salts and other fillers in the waste material) compounds ensures substantially complete immobilisation of the waste material components.

It is possible that a competitive reaction to chelation and microencapsulation is occurring in the formation of metal oxide salts. The metal oxide salts are typically quite insoluble and may be sufficiently insoluble in their own right to pass TCLP (Toxicity Characteristic Leaching Procedure in accordance with US-EPA 1311 method) testing in some instances. For example, it has been found during the treatment of lower level mercury waste that the omission of the citric acid still resulted in an effective settable composition, microencapsulating the waste and passing TCLP requirements. However, in many instances it appears to be necessary to firstly form a chelate to effect suitable microencapsulation.

Work on iron sulfates and chlorides has provided similar results. For arsenic compounds and other non-ionic chemicals, chelation is apparently not as significant in the encapsulation reaction. The encapsulation mechanism is more likely due to absorption of the waste material into the highly reactive caustic magnesium oxide matrix. The absorption may also give lower waste leachate due to the formation of chemical bonds that are move covalent than ionic in nature. The exact mechanism of how caustic magnesium oxide bonds to organic and non-ionic materials is not well understood in the scientific literature.

EXAMPLES

Embodiments of the invention will now be described and illustrated by the following non-limiting examples.

Mercury

Example 1A

Mercury contaminated soil containing up to 500 ppm mercury was encapsulated in the following manner. Mercury contaminated soil, 500 g, from a chlor-alkali industry, and water was mixed to form a thick homogeneous slurry. Citric acid 25 g, was dissolved into the mixture and all stirred until homogeneous. Aluminium sulfate 50 g, was dissolved into the mixture and all stirred until homogeneous. Caustic magnesium oxide 125 g, and additional water as required were added to form a thick just pourable mixture. The composition set in a few hours and was tested after 14 days.

Example 1B

In this example all experimental conditions were the same as for Example 1A except that aluminium sulfate 50 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 0.02 mg/L mercury, which is below the allowed limit of 0.2 mg/L, making the encapsulated composition safe for an unlined tip.

Copper, Nickel, Manganese & Lead

Example 2A

Copper sludge having TCLP results for the untreated waste of: copper=12.5 mg/L, nickel=53.7 mg/L, manganese=23.5 mg/L and lead=61.2 mg/L was encapsulated in the following manner. Copper sludge, 300 g, and water was mixed to form a thick homogeneous slurry. Citric acid 20 g, was dissolved into the mixture and all stirred until homogeneous. Aluminium sulfate 20 g, was dissolved into the mixture and all stirred until homogeneous. Caustic magnesium oxide 100 g, and additional water as required were added to form a thick just pourable mixture. The composition set in a few hours and was tested after 14 days.

Example 2B

In this example all experimental conditions were the same as for Example 2A except that aluminium sulfate 20 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of <1.0 mg/L copper, <1.0 mg/L nickel, <2.4 mg/L manganese and <1.0 mg/L lead which are significantly below the allowed limits, making the encapsulated composition safe for an unlined tip.

(II) Copper

Example 3A

Semiconductor waste containing up to 50% copper oxide was encapsulated in the following manner. Copper sludge, 500 g, from the semiconductor industry, and water was mixed to form a thick homogeneous slurry. Citric acid 40 g, was dissolved into the mixture and all stirred until homogeneous. Aluminium sulfate 30 g, was dissolved into the mixture and all stirred until homogeneous. Caustic magnesium oxide 250 g, and additional water as required were added to form a thick just pourable mixture. The composition set in a few hours and was tested after 14 days.

Example 3B

In this example all experimental conditions were the same as for Example 3A except that aluminium sulfate 30 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 0.4 mg/L copper, which is significantly below the allowed limit, making the encapsulated composition safe for an unlined tip.

Lead

Example 4A

Semiconductor waste having TCLP results for the untreated waste of: Lead=7.28 mg/L was encapsulated in the following manner. Waste, 500 g, from the semiconductor industry, and water was mixed to form a thick homogeneous slurry. Citric acid 5 g, was dissolved into the mixture and all stirred until homogeneous. Aluminium sulfate 16 g, was dissolved into the mixture and all stirred until homogeneous. Caustic magnesium oxide 166 g, and additional water as required were added to form a thick just pourable mixture. The composition set in a few hours and was tested after 14 days.

Example 4B

In this example all experimental conditions were the same as for Example 4A except that aluminium sulfate 16 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 1.73 mg/L lead which is below the allowed limit of 5 mg/L, making the encapsulated composition safe for an unlined tip.

Example 5A

A contaminated lead waste from the lead recycling industry was encapsulated in the following manner. Waste, 190 g, from lead recycling industry, and water was mixed to form a thick homogeneous slurry. Citric acid 30 g, was dissolved into the mixture and all stirred until homogeneous. Aluminium sulfate 33 g, was dissolved into the mixture and all stirred until homogeneous. Caustic magnesium oxide 330 g, and additional water as required were added to form a thick just pourable mixture. The composition set in a few hours and was tested after 14 days.

Example 5B

In this example all experimental conditions were the same as for Example 5A except that aluminium sulfate 33 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 0.4 mg/L lead, which is below the allowed limit of 5 mg/L, making the encapsulated composition safe for an unlined tip.

Copper & Lead

Example 6A

Plating sludge containing 12,634 mg/kg copper and 23,869 mg/kg lead was encapsulated in the following manner. Plating sludge, 180 g, from Resource Technology Corporation, Laramie Wyo., catalog #CRM010-100, and water was mixed to form a thick homogeneous slurry. Citric acid 27 g, was dissolved into the mixture and all stirred until homogeneous. Aluminium sulfate 45 g, was dissolved into the mixture and all stirred until homogeneous. Caustic magnesium oxide 450 g, and additional water as required were added to form a thick just pourable mixture. The composition set in a few hours and was tested after 14 days.

Example 6B

In this example all experimental conditions were the same as for Example 6A except that aluminium sulfate 45 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 0.1 mg/L copper and 0.4 mg/L lead which are significantly below the allowed limits, making the encapsulated composition safe for an unlined tip.

Cresols & Phenols

Example 7A

Certified Superfund soil having TCLP results for the untreated waste of: total cresols=495 mg/L, 2,4,6-trichlorophenol=27.5 mg/L, pentachlorophenol=27 mg/L, 2,4-D=24.9 mg/L Certified Superfund soil, 202.5 g, from Resource Technology Corporation, Laramie Wyo., catalog #CRM 401-225, sand 697.5 g and water was mixed to form a thick homogeneous slurry. Citric acid 27 g, was dissolved into the mixture and all stirred until homogeneous. Aluminium sulfate 90 g, was dissolved into the mixture and all stirred until homogeneous. Caustic magnesium oxide 900 g, and additional water as required were added to form a thick just pourable mixture. The composition set in a few hours and was tested after 14 days.

Example 7B

In this example all experimental conditions were the same as for Example 7A except that aluminium sulfate 90 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 60 mg/L total cresols, and not detected for each of 2,4,6-trichlorophenol, pentachlorophenol, 2,4-D, which are all significantly below the allowed limits, making the encapsulated composition safe for an unlined tip.

Arsenic, Cadmium & Lead

Example 8A

Incinerator ash having TCLP results for the untreated waste of: arsenic=31 mg/L, cadmium=65 mg/L and lead=29 mg/L was encapsulated in the following manner. Metals in ash, 405 g, from Resource Technology Corporation, Laramie Wyo., catalog #CRM205-225, and water was mixed to form a thick homogeneous slurry. Citric acid 36 g, was dissolved into the mixture and all stirred until homogeneous. Aluminium sulfate 90 g, was dissolved into the mixture and all stirred until homogeneous. Caustic magnesium oxide 900 g, and additional water as required were added to form a thick just pourable mixture. The composition set in a few hours and was tested after 14 days.

Example 8B

In this example all experimental conditions were the same as for Example 8A except that aluminium sulfate 90 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 0.11 mg/L arsenic, <0.05 mg/L cadmium and 0.05 mg/L lead which are all significantly below the allowed limits of 5 mg/L, 1 mg/L and 5 mg/L respectively, making the encapsulated composition safe for an unlined tip.

Polychlorinated Biphenyl (PCB)

Example 9A

Polychlorinated biphenyl (PCB) in oil, containing 35.2 mg/Kg Arochlor was encapsulated in the following manner. Polychlorinated biphenyl (PCB) in oil 28 g, from Resource Technology Corporation, Laramie Wyo., catalog #CRM920-010, sand 121 g, soil 301 g and water was mixed to form a thick homogeneous slurry. Citric acid 12 g, was dissolved into the mixture and all stirred until homogeneous. Aluminium sulfate 20 g, was dissolved into the mixture and all stirred until homogeneous. Caustic magnesium oxide 200 g, and additional water as required were added to form a thick just pourable mixture. The composition set in a few hours and was tested after 14 days.

Example 9B

In this example all experimental conditions were the same as for Example 9A except that aluminium sulfate 20 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed PCBs were undetectable, indicating successful solidification and stabilization, making the encapsulated composition safe for an unlined tip.

Arsenic

Example 10A

Arsenic trioxide 27 g, from EM Science, Gibbstown N.J. Catalog #AX 1745-2, sand 873 g and water was mixed to form a thick homogeneous slurry. Citric acid 45 g and sodium carbonate 45 g, were dissolved into the mixture and all stirred until homogeneous. Aluminium sulfate 90 g, was dissolved into the mixture and all stirred until homogeneous. Caustic magnesium oxide 900 g, and additional water as required were added to form a thick just pourable mixture was achieved. The composition set in a few hours and was tested after 14 days.

Example 10B

In this example all experimental conditions were the same as for Example 10A except that aluminium sulfate 90 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 1.3 mg/L arsenic, which is below the allowed limit of 5 mg/L, making the encapsulated composition safe for an unlined tip.

Example 11A

Arsenic trioxide fume 1000 g, from the gold mining industry, and caustic magnesium oxide 2000 g were dry mixed. Citric acid 60 g and aluminium sulfate 200 g were dissolved in water and added to the dry mix and all stirred until homogeneous to form a thick just pourable mixture. The composition set in a few hours and was tested after 14 days.

Example 11B

In this example all experimental conditions were the same as for Example 11A except that aluminium sulfate 200 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 1.6 mg/L arsenic, which is below the allowed limit of 7 mg/L, making the encapsulated composition safe for an unlined tip.

Example 12A

Arsenic, tin and antimony fume 1000 g, from the tin mining industry, and water was mixed to form a thick homogeneous slurry. Citric acid 60 g, was dissolved into the mixture and all stirred until homogeneous. Aluminium sulfate 240 g, was dissolved into the mixture and all stirred until homogeneous. Caustic magnesium oxide 2000 g, and additional water as required were added to form a thick just pourable mixture. The composition set in a few hours and was tested after 14 days.

Example 12B

In this example all experimental conditions were the same as for Example 12A except that aluminium sulfate 240 g was dissolved into the mixture after the addition of caustic magnesium oxide rather than beforehand, and the mixture then stirred until homogeneous. Additional water as required was added to form a thick just pourable mixture. The composition set in a few hours and was tested after 14 days.

The TCLP leachate showed a leach of 3.7 mg/L arsenic, which is below the allowed limit of 7 mg/L, making the encapsulated composition safe for an unlined tip.

Chromium

Example 13A

Chromium waste, containing 16-18% chromium from the foundry industry, 1 part, and water was mixed to form a thick homogeneous slurry. Citric acid, aluminium sulfate and caustic magnesium oxide 4 parts and additional water as required were added to form a thick just pourable mixture. The composition set in a few hours and was tested after 14 days.

Example 13B

In this example all experimental conditions were the same as for Example 13A except that the aluminium sulfate part was dissolved into the mixture after the addition of caustic magnesium oxide rather than beforehand or simultaneously, and the mixture then stirred until homogeneous. Additional water as required was added to form a thick just pourable mixture. The composition set in a few hours and was tested after 14 days.

The TCLP leachate showed a leach of 1.6 mg/L chromium, which is below the allowed limit of 5 mg/L, making the encapsulated composition safe for an unlined tip.

Example 14

In this example the following hazardous waste materials were tested for leachability after being encapsulated into specific settable binder compositions according to the present invention.

The sample reference nomenclature (DMAU-xxx) employed herein was derived from a proprietary referencing system and is maintained for convenience. The specific settable binder compositions according to the present invention are referred to by their trade name DOLOCRETE (owned by Dolomatrix International Ltd), with DOLOCRETE A referring to the settable binder, DOLOCRETE NI referring to an organic acid additive, and DOLOCRETE MI referring to a setting agent.

Samples:
(a) DMAU-036—from the Kanowna bell mine (20 kilometers northeast of Kalgoorlie in Western Australia) $As_2O_3$—leach testing for arsenic.
(b) DMAU-555—Yerranderrie silver mine (2 hours southwest of Sydney, Australia)—leach testing for arsenic & lead.
(c) DMAU-551—Electric Arc Furnace dust—Leach testing for lead, cadmium & zinc
(d) DMAU-PAH—25% coal tar in soil—Leach testing for PAH, cyanide & phenols The trials consisted of two separate treatment methods, using the same set of reagents.

1. In the first case the waste samples were treated by the sequential addition of reagents, with thorough mixing of the trial treatment samples between additions. The sequence of addition was as follows:

WASTE>WATER>DOLOCRETE A>DOLOCRETE NI>DOLOCRETE MI

2. In the second case (Samples-2) the waste samples were treated by the concurrent addition of all the reagents listed above, followed by mixing in of the trial treatment (waste) samples. For sample types 1. & 2. above for each of samples (a) to (c), unconfined compressive strength (UCS) mold samples were taken for both the sequential reagent addition trial samples and the concurrent reagent addition trial samples (i.e. a pair of UCS samples was taken for each of those waste types in accordance with AS1012.8.1 clauses 9.3.9 and 12.1). The leachate results TCLP (toxicity characteristic leaching procedure) and amounts for SCC (specific contaminant concentration) were also determined. In the case of sample (d) PAH in Leachate and PAH in soil tests were conducted, PAH being polycyclic aromatic hydrocarbons.

Results for Sample:
1) DMAU-036—Kanowna Bell As2O3

Observations:
Was very dry and dusty to begin with.
Began evolving heat, and possibly gas, upon moistening.
Took 0.9 parts water to 1 part waste to "first slurry".
At 0.7 parts water addition a suspected auto-ignition occurred.
Low level NH3 generation.
Able to make UCS samples for both reagent trials.

DMAU-036—Kanowna Bell As2O3 Results:

1-DMAU-036-1 (New Method)
As-TCLP=490000 ug/L
As-SCC=140000 mg/kg

1-DMAU-036-2 (Old Method)
As-TCLP=590000 ug/L
As-SCC=140000 mg/kg

The trial sequence 1. (ie. according to the present method) thus showed a 17% improvement in TCLP results. The SCC results were similar for trial sequences 1 and 2.

The UCS results showed for DMAU-036-1 a result of 0.78 MPa and for DMAU-036-2 a result of 0.33. Thus, there was a greater than 100% improvement in the UCS results for trial sequence 1.

2) DMAU-555—Yerranderie Silver Mine Waste

Observations:
Dry but not dusty to begin with.
No heat evolution.
Took 0.4 parts water to 1 part waste to "first slurry".
After addition of DOLOCRETE A, took a further 0.1 part water to re-slurry.

DMAU-555—Yerranderie Silver Mine Waste Results:

DMAU-555-1 (New Method)
As-TCLP=60 ug/L
Pb-TCLP=350 ug/L
As-SCC=81000 mg/kg
Pb-SCC=30000 mg/kg 2-DMAU-555-2 (Old Method)
As-TCLP=~60 ug/L
Pb-TCLP=450 ug/L
As-SCC=74000 mg/kg
Pb-SCC=38000 mg/kg For Arsenic there was no significant difference in the TCLP results of trial sequences 1 and 2. However, the Pb results were noticeably improved in trial sequence 1. A higher SCC result in trial sequence 1 for each of As and Pb indicated a higher take up and retention of these contaminants.

3) DMAU-551—EAF Dust

Observations:
Dry but not dusty to begin with.
No heat evolution.
Took 0.375 parts water to 1 part waste to "first slurry".
Able to make UCS samples for each reagent trial.

DMAU-551—EAF Dust Results:

3-DMAU-551-1 (New Method)
Cd-TCLP=35 ug/L
Pb-TCLP=100 ug/L
Cd-SCC=360 mg/kg
Pb-SCC=26000 mg/kg 3-DMAU-551-2 (Old Method)
Cd-TCLP=68 ug/L
Pb-TCLP=200 ug/L
Cd-SCC=350 mg/kg
Pb-SCC=22000 mg/kg Both the contaminants in this trial showed favorable results, with the new method (ie. new sequence 1) halving the leachates for both Cd and Pb. A higher SCC result in trial sequence 1 for each of Cd and Pb indicated a higher take up and retention of these contaminants.

The UCS results showed for DMAU-551-1 a result of 0.83 MPa and for DMAU-551-2 a result of 0.36. Thus, again there was a greater than 100% improvement in the UCS results for trial sequence 1.

4) DMAU-PAH—25% Coal Tar in Soil

Observations:
Moist tarry soil to begin with.
No heat evolution.
Took 0.35 parts water to 1 part waste to "first slurry"

DMAU-PAH—Results:

PAH in leachate by gas chromatography (totals of acenaphthene, acenaphthylene, anthracene, benzanthracene, benzopyrene, benzofluoranthene, benzoperylene, dibenzanthracene, chrysene, naphthalene, fluoranthene, fluorine, indenopyrene, phenanthrene, pyrene):

4-DMAU-PAH-1<5841 µg/l

4-DMAU-PAH-2<5874 µg/l

PAH in Soil by Gas Chromatography:

4-DMAU-PAH-1<2800 mg/kg

4-DMAU-PAH-2<2800 mg/kg

Total Cyanide in Leachate:

4-DMAU-PAH-1<0.01 mg/l

4-DMAU-PAH-2<0.01 mg/l

Total Cyanide in Soil:

4-DMAU-PAH-1<1.2 mg/kg

4-DMAU-PAH-2<1.4 mg/kg

Total Phenolics in Leachate:

4-DMAU-PAH-1<3 mg/l

4-DMAU-PAH-2<4 mg/l

Total Phenolics in Soil:

4-DMAU-PAH-1<110 mg/kg

4-DMAU-PAH-2<120 mg/kg

It can be seen that trial sequence 1 substantially showed favorable (improved) results.

It is to be understood that the preceding examples are provided for illustrative purposes only, and are not intended to limit the scope of the invention in any way. Furthermore, it should be appreciated that various other changes and modifications can be made to the embodiments, in addition to those already described, without departing from the basic inventive concepts. All such variations and modifications are to be considered within the scope of the present invention, the nature of which is to be determined from the foregoing description.

It is to be understood that, if any prior art information is referred to herein, such reference does not constitute an admission that the information forms a part of the common general knowledge in the art, in Australia or any other country.

The invention claimed is:

1. A method of incorporating a material in a settable binder, the method comprising the steps of:
   (a) mixing the material with the binder, as a slurry or for subsequent formation into a slurry, the binder including a source of caustic magnesium oxide;
   (b) adding an organic acid additive to the material, the binder or a mixture thereof;
   (c) after steps (a) and (b), adding a setting agent to the slurry that enhances setting of the binder.

2. A method as claimed in claim 1 wherein the setting agent comprises between 0.1 to 30% by weight of the caustic magnesium oxide in the mixture.

3. A method as claimed in claim 1 wherein the setting agent is selected from the group comprising: sulfates and chlorides.

4. A method as claimed in claim 3 wherein the setting agent is selected from the group comprising metal sulfates, such as magnesium sulfate, iron sulfate and aluminium sulfate.

5. A method as claimed in claim 3 wherein the setting agent is selected from the group comprising metal chlorides, such as iron chloride and sodium chloride.

6. A method as claimed in claim 1 wherein the slurry is an aqueous slurry.

7. A method as claimed in claim 1 wherein the material is a hazardous material or component thereof.

8. A method as claimed claim 1 wherein the organic acid additive is selected from the group: citric acid, lemon acid, acetic acid, glycolic acid, oxalic acid, other di or poly carboxylic acids, tartaric acid, salicylic acid, ethylenediamine tetra acetic acid (EDTA) and other tetra acids.

* * * * *